Sept. 29, 1925.
G. FORNER
STEAM PLANT
Filed July 1, 1924
1,555,465
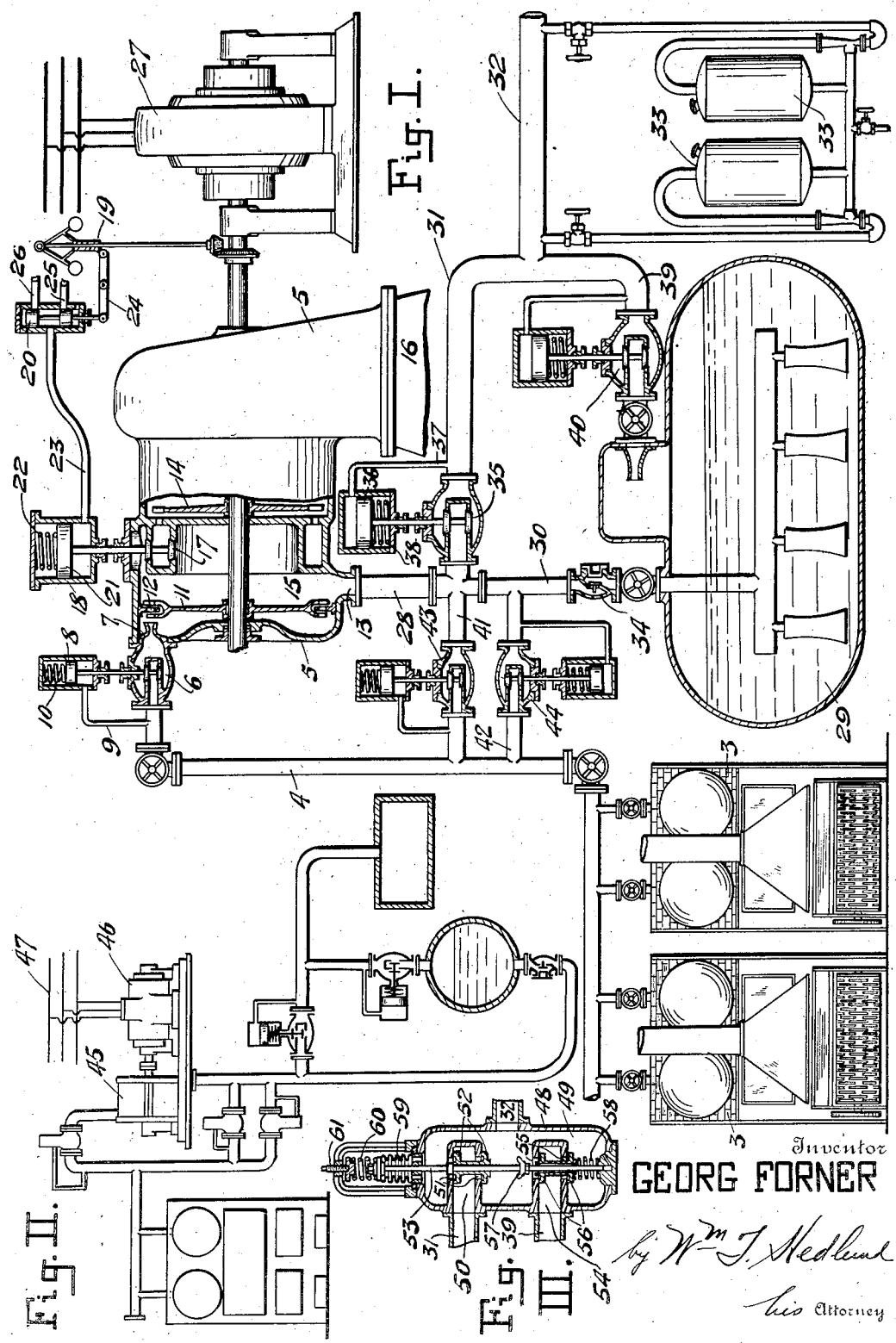
Inventor
GEORG FORNER
by Wm T. Medlund
his Attorney Patented Sept. 29, 1925.

1,555,465

UNITED STATES PATENT OFFICE.

GEORG FORNER, OF BERLIN, GERMANY, ASSIGNOR TO A/B VAPORACKUMULATOR, OF NEW YORK, N. Y., A CORPORATION OF SWEDEN.

STEAM PLANT.

Application filed July 1, 1924. Serial No. 723,549.

*To all whom it may concern:*

Be it known that I, GEORG FORNER, a citizen of the German Republic, residing in Berlin, Germany, have invented certain new and useful Improvements in Steam Plants (for which I have filed applications in Germany, January 4, 1923, and January 8, 1923), of which the following is a specification.

This application is in part a continuation of my copending application Serial No. 686,185, filed January 14, 1924.

My invention relates to steam plants and more particularly to steam plants equipped with steam accumulators and with motors from which steam is withdrawn for use in low pressure consumers, for industrial purposes, such as heating, bleaching and dyeing. Such motors are ordinarily extraction turbines and non-condensing turbines.

The object of my invention is to provide a plant having higher efficiency than has previously been possible.

The disadvantages of previous plants which are overcome by this invention are as follows. In plants where the motor and accumulator are connected in parallel, a great amount of steam passes parallel to the motor or stages of the motor without producing work. There is therefore a great drop of pressure which is entirely lost as far as the generation of power is concerned. In plants where the motor and accumulator are connected in series the motor chamber from which steam is withdrawn to be led to the low pressure consumers has been connected with the accumulator in one of two ways, first, in such a manner that the pressure in the accumulator and the said chamber is the same and second, in such a manner that the extraction pressure is always higher than the accumulator pressure. In the first case the motor stages near the point where the steam is withdrawn work permanently under the widely varying pressures prevalent in the accumulator thus impairing considerably the efficiency of the motor and a very great drop of pressure exists between the point of extraction of the motor and the low pressure conduits, this drop of pressure being lost for the purposes of power generation. In the second case there is a pressure drop between the motor and the accumulator as well as between the accumulator and the low pressure conduits which is entirely lost for purposes of power generation.

By means of the present invention a greater amount of work is done by the steam in passing from the boilers to the low pressure consumers than with these previous arrangements. Normally all the steam passes through motors and the extraction pressure, at times of discharge of the accumulator, is substantially the same as the pressure in the low pressure conduits although the accumulator pressure may be considerably higher and, at times of charge of the accumulator the extraction pressure is substantially the same as the pressure in the accumulator. Thus there is a greater drop of pressure which can be utilized in the motor between the supply to the motor and the extraction point and the efficiency of the motor and consequently of the plant can be increased.

The invention is best understood by reference to the accompanying drawing in which:

Fig. I is a more or less diagrammatic illustration of one form of my invention, embodying a turbine of the extraction type, otherwise known as a tapping or bleeder turbine.

Fig. II is a diagram of a plant according to my invention equipped with the type of turbine variously termed back-pressure, counter pressure, and non-condensing.

Fig. III illustrates a combined valve adaptable for use in one form of my invention.

Referring more particularly to Fig. I, 3 designates the steam generator comprising one or more boilers, which may be of any type and fired in any way. Steam generated in the boilers is conducted by means of high pressure conduit 4 to the turbine 5. The steam flowing into the turbine is controlled by overflow valve 6 arranged adjacent the steam chest 7 of the turbine. This overflow valve 6 is operated in response to the pressure in front of the same, that is, the pressure in the high pressure conduit 4. In the illustration pressure acts through conduit 9 on the lower side of piston 8 attached to the valve stem of the overflow valve. On the other side of the piston 8 is a spring 10 which opposes the steam pressure. The valve operates to increase the flow to the turbine upon rise of pressure in front of the same and, conversely, to decrease the flow to the motor upon decrease of the actuating pressure. It is to be understood that the valve illustrated is merely by way of example and that any valve may be used which will perform the same function, many such valves being well known. This overflow valve operates to maintain a constant pressure in the boilers, thereby maintaining high boiler efficiency.

11 indicates the wheel of the high pressure stages of the turbine and 12 the stationary blades to direct the steam to the second stage of the wheel. 15 indicates a chamber of the turbine situated between stages. 13 indicates the extraction port of the turbine, through which bleeder steam is supplied to the low pressure consumers from chamber 15. 14 indicates an intermediate stage of the turbine operating at lower pressure than the pressure in chamber 15. The steam in the turbine separates in the chamber 15, passing partly through port 13, and partly to the lower pressure stages including 14, the latter steam passing eventually into a condenser indicated at 16. The steam passing to the condenser is controlled by means of valve 17, operatively connected to piston 21 and operated in response to the speed of the turbine by means of governor 19. The governor and valve 17 may be of any desired construction so long as its operation is such that upon increase of speed or the turbine, valve 17 decreases the flow from the supply chamber to the lower pressure stages of the turbine, and, conversely, increases the flow upon decrease of speed, so that a uniform speed is maintained. By way of example I have shown valve 17 operated by means of a servomotor 18, in turn controlled by a pilot valve 20. The servomotor comprises a piston 21 actuated on the lower side by liquid pressure and acted upon by a spring 22 on the upper side. Liquid is admitted or discharged from the lower side of piston 21 through pipe 23 and is controlled by pilot valve 20. When the speed of the turbine increases governor 19 moves the pilot valve through lever 24 to connect the lower side of the piston 21 with a discharge pipe 25, thus allowing spring 22 to move the valve 17 toward closing position. Conversely when the speed of the turbine decreases the lower side of piston 21 is connected with a supply pipe 26 for liquid under pressure, thus opening valve 17. I have shown diagrammatically a way in which the turbine may be controlled but it will be obvious to those versed in the art that many other means of controlling the flow of steam through the turbine may be employed without departing from the spirit of this invention.

The turbine is shown as driving an electric generator 27.

Connected to the extraction port 13 is the extraction conduit 28. The steam passing through this extraction conduit may pass to the accumulator 29 by means of conduit 30, which, for purposes of description, I will term "accumulator charge conduit"; or, may pass by means of conduit 31 to the low pressure conduit 32. From conduit 32 low pressure steam is supplied to low pressure consumers 33 which may be of any type, kiers being shown for purposes of illustration. In the accumulator charge conduit 30 there is a check valve 34 which operates to allow the steam to pass through this conduit into the accumulator to be stored therein in known manner, but prevents the flow of steam or water from the accumulator back into the accumulator charge conduit.

The flow of steam from chamber 15 through extraction conduit 28 to the low pressure conduit 32 is controlled by means of valve mechanism, preferably a reducing valve indicated at 35. This valve mechanism is responsive to the pressure in conduit 31 and consequently in low pressure conduit 32 and operates to increase the flow therethrough upon drop of pressure and to decrease the flow therethrough upon increase of pressure. This valve operates to maintain a substantially constant pressure in the low pressure conduit. In the form shown, a piston 36 is acted upon by the pressure of the low pressure conduit on one side by means of conduit 37 and a spring 38 acts on the other side. This piston is attached to the valve stem of the valve.

Conduit 39 which I term "accumulator discharge conduit" connects the steam space of the accumulator with low pressure conduit 32 at a point beyond reducing valve 35, that is between reducing valve 35 and the low pressure consumers. Flow through this accumulator discharge conduit is also controlled by automatic valve mechanism, preferably a reducing valve 40. This valve 40 operates in the same manner as valve 35, but is set to open at a value of pressure lower than that at which valve 35 opens, so that upon decreasing pressure in the low pressure conduit valve 35 opens first and valve 40 opens after valve 35 is wide open.

Conduits 41 and 42 connect high pressure conduit 4 with a conduit in the conduit system of the plant carrying a relatively low pressure. This connection is in parallel to the high pressure section of the steam motor 5. In the conduit 41 is inserted an overflow valve 43 operating in similar manner to overflow valve 6. The purpose of these parts 41 and 43 is to conduct steam from the high pressure conduit 4 to the low pressure parts of the conduit system when there is a surplus of steam generated which cannot be taken care of by the motor. Valve 43 is set to open at a higher pressure than that at which valve 6 opens. Valve 43 is normally closed and the regulation of steam from the boiler is controlled by valve 6. If valve 6 becomes wide open and there is still a surplus of steam in conduit 4, valve 43 opens and allows this excess to pass to the accumulator or the low pressure consumers. In the conduit 42 is inserted a reducing valve 44. The purpose of this valve is to allow steam to pass from the high pressure conduit 4 to the low pressure part of the conduit system when the state of charge of the accumulator had reached an undesirably low value. This valve 44 is set to open at the pressure corresponding to discharge of the accumulator. This is in effect a safety element which guards against a complete lack of steam for the low pressure consumers. It is preferable to distribute the steam in the plant if a contingency should arise when the steam reserve became exhausted, even at the expense of lowering the pressure somewhat in the boilers and the high pressure conduits connected therewith than to cut off steam from valuable process batches. In such a contingency the boilers, must, of course, be more intensively fired. In practice one pipe takes the place of conduits 41 and 42 and one valve, operated both in response to pressure before and behind the same, takes the place of valves 43 and 44.

In operation; suppose that valve 40 is closed and valve 35 is partly open. Now suppose there is a surplus of steam passing through extraction conduit 28 over the consumption of the low pressure consumers. The pressure in the extraction conduit builds up until it opens check valve 34, thus allowing the surplus of steam to pass into the accumulator. The valve 35 then controls the relative flow of steam to the accumulator and to the low pressure consumers. Under this condition, as is obvious, the pressure in the chamber 15 must be slightly higher than the pressure in the accumulator and varies as the accumulator pressure varies.

Suppose the pressure in conduit 32 falls due either to increased consumption in the low pressure consumers or decreased supply from the turbine, and at the same time there is a constant supply of steam through port 13. As the pressure decreases valve 35 opens more and more and the pressure in the extraction conduit decreases until it equals the accumulator pressure when check valve 34 closes to prevent back flow of stream through conduit 30. If the consumption of the low pressure consumers continues to be greater than the steam supply from the motor, the pressure will continue to fall until valve 35 is wide open and, at the same time the pressure in the extraction conduit reduces to the pressure in conduits 31 and 32. At this time valve 40 opens and steam is supplied from the accumulator to the low pressure consumers to make up for the deficiency. During this period of discharge of the accumulator, it will be seen that the pressure in the extraction conduit of the motor is constant and substantially the same as the pressure in the low pressure conduit. Thus during approximately one half the time, the extraction pressure has the low value of the low pressure conduits although the pressure in the accumulator may be considerably higher and the extraction pressure is independent of the gradually changing pressure of the accumulator.

The difference in the values of pressure at which the two valves 35 and 40 are set to open is very small so that there is substantially no difference in pressure in the low pressure conduit whether the supply thereto comes entirely from the motor, entirely from the accumulator or from both.

Suppose, now, that the pressure in conduit 32 increases due, for example, to decreased consumption. The rising pressure then first closes valve 40. Upon further rise in pressure valve 35 closes more or less and throttles the flow of steam therethrough. This causes the pressure to build up in conduits 28 and 30 until check valve 34 opens to allow the excess steam to pass into the accumulator, as above described. It is believed that the operation of the other elements of the plant will be readily understood from the above description.

Fig. II shows a plant similar to that of Fig. I except that, in place of the extraction turbine 5, a non-condensing turbine 45 is used. This turbine drives an electric generator 46 coupled in parallel into the electric circuit 47. This connection with the circuit is of such a nature that all the power of turbine 45 can be transferred into electrical energy in the circuit 47, regardless of the variations of power supplied by turbine 45. In Figure II the motor chamber is not between stages as was the case in Figure I but is the space of lowest pressure in the motor, from which the steam passes to the back pressure line. The mode of operation of this plant will be readily understood from the description of the plant according to Fig. I and its operation.

Fig. III shows a combined valve which may be used in place of valves 35 and 40. This valve is placed at the jointure of conduits 31, 32 and 39. In the valve casing 48 is a chamber 49 connected to conduit 32. A chamber 50 is connected to the conduit 31 and has ports 51 communicating with chamber 49. These ports are controlled by valve members 52 constituting a balanced valve. Valve members 52 are firmly connected to rod 53. A chamber 54 is connected to the conduit 39 and has ports 55 therein, controlled by valve members 56, constituting a second balanced valve. Valve members 56 are connected by a sleeve which loosely encloses the rod 53. On the rod 53 is a stop 57 which is adapted to engage one of the valve members 56 to move the same when the pressure in conduit 32 drops below a predetermined value. Spring 58 serves to retain valve members 56 against their seats. Rod 53 is attached to bellows diaphragm 59. This bellows diaphragm is subjected to the pressure in chamber 49, which is the same as the pressure in conduit 32. The force of the pressure acting on the bellows diaphragm is opposed by spring 60 which is adjustable by means of set screw 61. Stop 57 is adjustable on rod 53.

This valve takes the place of the two valves 35 and 40 and operates in the same manner. With valve members 51 and 56 seated and a decreasing pressure in conduit 32, the bellows 59 collapses and first opens ports 51 without affecting ports 55. Upon further decrease of pressure, stop 57 engages the upper valve disc 56 and opens ports 55. As is obvious this valve is, in effect two reducing valves combined in a single casing.

I consider that my invention resides primarily in the broad aspects hereinbefore set forth and only secondarily in the details of construction and arrangement wherefore I do not restrict myself to the particular constructions here disclosed, but only by the terms of the claims and the state of the prior art.

Having thus described my invention, what I claim is:

1. In combination, a steam chamber, means to supply steam thereto, an accumulator, a low pressure conduit normally carrying steam of lower pressure than the accumlator pressure, a consumer connected to said low pressure conduit, means to conduct steam from said chamber to said accumulator and maintain substantially the same pressure in said chamber and in said accumulator when the accumulator is charged, and means to conduct steam from said chamber to said low pressure conduit and maintain substantially the same pressure in said chamber and said low pressure conduit when said accumulator discharges regardless of higher pressure prevailing in the accumulator.

2. In a steam plant, a steam generator, a steam chamber, means to conduct steam from the steam generator to the chamber, a steam accumulator, a steam consumer, a conduit connecting the accumulator with the consumer and adapted to conduct steam from the accumulator to the consumer, automatic valve mechanism operated by the pressure behind the same inserted in said conduit, a connection between said chamber and said conduit at a point between said valve mechanism and said consumer, means to allow passage of steam from said chamber to said accumulator with substantially the same pressure in said chamber and said accumulator and means to control passage of steam from the chamber to the consumer.

3. In a steam plant, a steam generator, a steam motor, means to conduct steam from the generator to the steam motor, a chamber in said motor, a steam accumulator, a low pressure conduit, a steam consumer adapted to receive steam from the low pressure conduit, means to conduct steam from the chamber to the low pressure conduit, means to conduct steam from the chamber to the accumulator, means to conduct steam from the accumulator to the low pressure conduit and automatic means to maintain the pressure in the chamber of the motor constant and substantially the same as the pressure in the low pressure conduit during the discharge period of the accumulator regardless of higher pressure prevailing in the accumulator.

4. In a steam plant, a steam generator, a steam motor, means to conduct steam from the steam generator to the motor, a chamber in said motor, a steam accumulator, a low pressure conduit, a steam consumer adapted to receive steam from said low pressure conduit, means to conduct steam from the chamber to the low pressure conduit, means to effect communication between the chamber and the accumulator when the pressure in the chamber exceeds the pressure in the accumulator due to surplus steam supply over momentary consumption and to reduce the pressure in the chamber to substantially that of the low pressure conduit when the accumulator discharges due to greater consumption than supply.

5. In a steam plant, a steam generator, a steam motor, means to conduct steam from the steam generator to the steam motor, a steam accumulator, a steam consumer, means to conduct steam from the motor to the consumer, a reducing valve therein controlled by the pressure immediately behind the same, means to conduct steam from the motor to the accumulator, a check valve therein, means to conduct steam from the accumulator to the consumer, a reducing valve therein.

6. In a steam plant, a steam generator, a steam motor comprising a plurality of sections, means to conduct steam from the steam generator to the steam motor, a chamber between two of said sections, an extraction conduit connected to said chamber, a communication between the two sections, speed responsive means to control flow through said communication, a steam accumulator, a steam consumer, a connecting conduit connecting the extraction conduit with the consumer, a reducing valve in said conduit controlled by the pressure immediately behind the same, an accumulator charge conduit connecting the extraction conduit with the accumulator, a check valve in the accumulator charge conduit, an accumulator discharge conduit extending from the accumulator to the connecting conduit at a point between the reducing valve and the consumer, and a second reducing valve in the accumulator discharge conduit.

7. In a steam plant, a steam generator, a steam motor comprising a plurality of sections, means to conduct steam from the steam generator to the steam motor, a chamber between two of said sections, an extraction conduit connected to said chamber, a communication between the two sections, speed responsive means to control flow through said communication, a steam accumulator, a steam consumer, a steam conduit connecting the accumulator with the consumer and adapted to conduct steam from the accumulator to the consumer, automatic valve mechanism operated by the pressure behind the same inserted in said steam conduit, a connection extending between said extraction conduit and said steam conduit and connected to said steam conduit at a point between said valve mechanism and said consumer, means to allow passage of steam from the chamber to the accumulator with substantially the same pressure in said chamber and said accumulator and means to control passage of steam from the motor to the consumer.

8. In a steam plant, a steam generator, a steam motor comprising a plurality of sections, means to conduct steam from the steam generator to the steam motor, a chamber between two of said sections, an extraction conduit connected to said chamber, a communication between the two sections, speed responsive means to control flow through said communication, a steam accumulator, a steam consumer, means to conduct steam from the extraction conduit to the accumulator, means to conduct steam from the extraction conduit to the consumer, means to conduct steam from the accumulator to the consumer, a check valve to control flow of steam from the extraction conduit to the accumulator, a reducing valve to control flow of steam from the extraction conduit to the consumer controlled by pressure immediately behind the same and a reducing valve to control flow of steam from the accumulator to the consumer.

9. In a steam plant, a steam generator, a steam motor comprising a plurality of sections, means to conduct steam from the steam generator to the motor, a chamber between two of said sections, a communication between said two sections, speed responsive means to control flow through said communication, a steam accumulator, a low pressure conduit, a steam consumer adapted to receive steam from the low pressure conduit, means to conduct steam from the chamber to the low pressure conduit, means to conduct steam from the supply chamber to the accumulator, means to conduct steam from the accumulator to the low pressure conduit and automatic means to maintain the pressure in the chamber of the motor constant and substantially the same as the pressure in the low pressure conduit during the discharge period of the accumulator regardless of higher pressure prevailing in the accumulator.

In testimony whereof I hereunto affix my signature.

GEORG FORNER.